United States Patent [19]
Chen

[11] Patent Number: 5,256,954
[45] Date of Patent: Oct. 26, 1993

[54] BATTERY PACK CHARGING DEVICE

[76] Inventor: Jeff Chen, 3F, No.15, Alley 1, Lane 30, Teng-Kung Rd., Tansui Chen, Taipei Hsien, Taiwan

[21] Appl. No.: 911,210

[22] Filed: Jul. 9, 1992

[51] Int. Cl.$^5$ .................. H02J 7/00; H01M 10/46
[52] U.S. Cl. .................................. 320/2; 320/15
[58] Field of Search ............................... 320/2, 15

[56] References Cited

U.S. PATENT DOCUMENTS

| | | | |
|---|---|---|---|
| 3,217,227 | 11/1965 | Sherwood | 320/2 X |
| 3,435,318 | 3/1969 | Mas | 320/2 X |
| 4,101,818 | 7/1978 | Kelly, III et al. | 320/2 |
| 4,214,197 | 7/1980 | Mann et al. | 320/2 |

Primary Examiner—R. J. Hickey
Attorney, Agent, or Firm—Ladas & Parry

[57] ABSTRACT

A battery pack charging device includes a housing with a base plate, a first upright wall which extends upwardly from the base plate and a second upright wall which similarly extends upwardly from the base plate and which is disposed opposite to the first upright wall. The first and second upright walls and the base plate define a receiving space to receive a battery pack. A movable wall assembly is provided in the receiving space adjacent to the first upright wall. The movable wall assembly includes a positioning wall member which faces the second upright wall and which is spaced from the second upright wall. The positioning wall member is movable towards or away from the first upright wall so as to vary the space between the positioning wall member and the second upright wall in order to correspond with the width of the battery pack. A frame of a movable electrical contact assembly is mounted on at least one of the second upright wall and the base plate. An elongated carriage is movably mounted along the frame. A pair of terminal seats are movably mounted on the carriage and have a respective electrical contact provided thereon. The terminal seats are movable along the carriage, and the carriage is movable along the frame so as to align the electrical contacts with corresponding contact terminals of the battery pack.

9 Claims, 9 Drawing Sheets

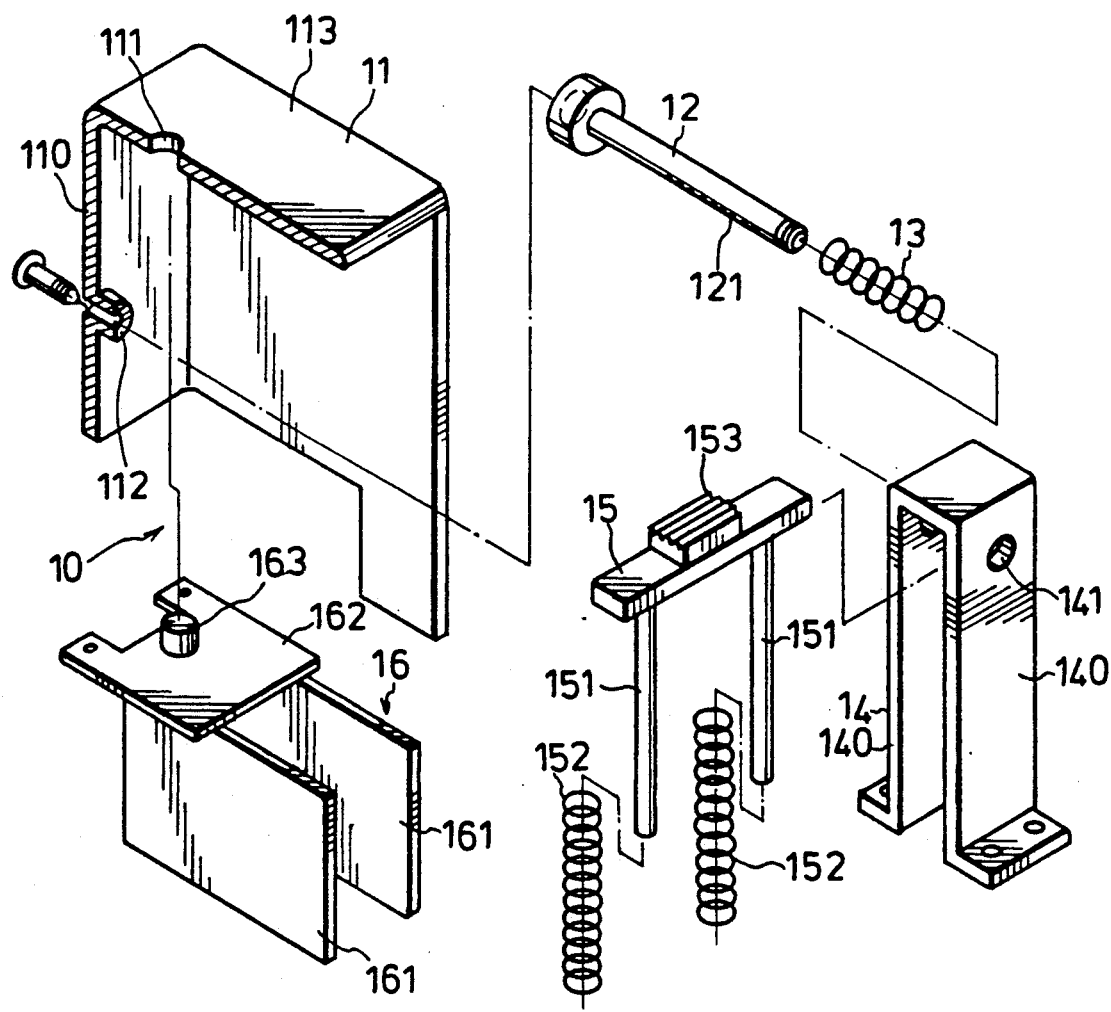
F I G. 5

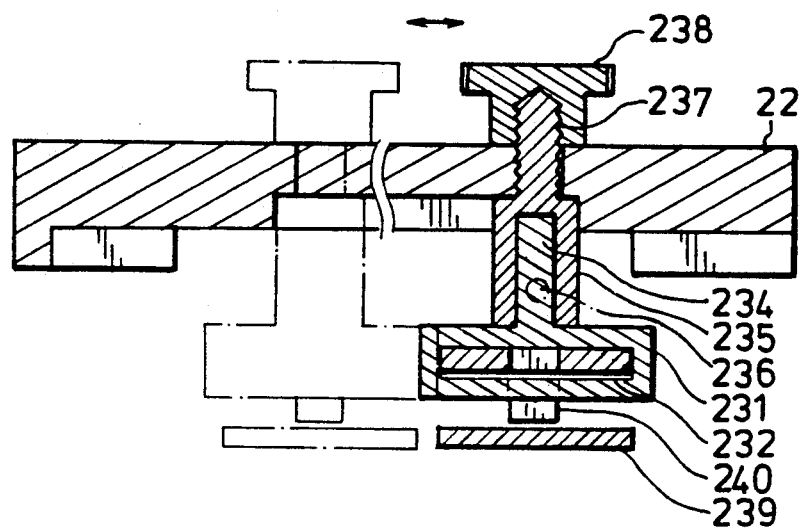
F I G. 8A
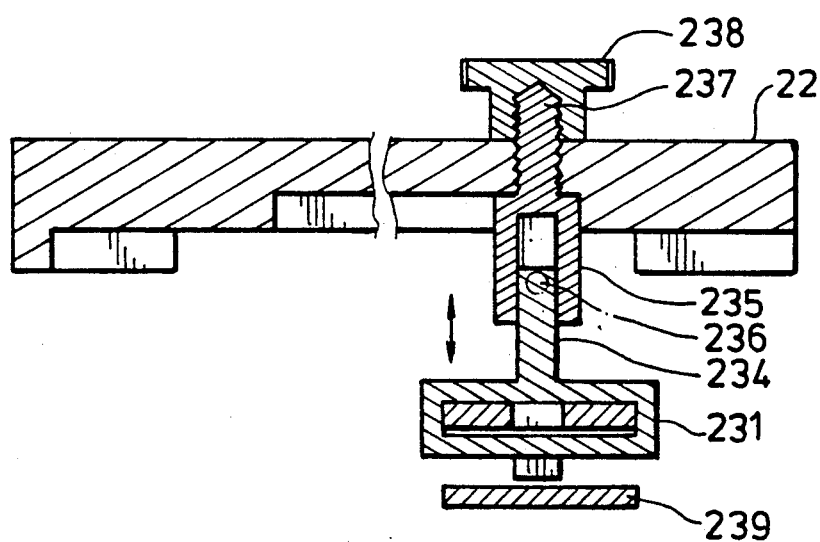
F I G. 8B

BATTERY PACK CHARGING DEVICE

BACKGROUND OF THE INVENTION

1. Field of the Invention

The invention relates to a battery charging device, more particularly to a battery charging device which is adapted to receive and charge battery packs of different sizes and specifications.

2. Description of the Related Art

Portable communications equipments, such as mobile telephones and the like, require a battery pack to operate the same. Since such communications equipments are available in different sizes and specifications, a corresponding type of battery pack is required. However, conventional battery pack charging devices, such as that shown in FIG. 1, are only capable of charging a maximum of two different types of battery packs. If the communications equipment is to be replaced by one which has a battery pack that does not fit the current battery pack charging device, a new battery pack charging device has to be purchased.

A battery pack charging device usually has a receiving space for receiving a battery pack therein, positive and negative electrical contacts for connecting electrically the battery pack to a charger circuit, and means for holding the battery pack in place inside the receiving space so as to achieve tight and proper electrical connection with the electrical contacts. The conventional battery charging device (A) shown in FIG. 1 is shown to have a first receiving space (a1) and a second receiving space (b1).

Referring to FIG. 2, the battery charging device (A) is shown to further have a pair of first positioning spring units (a2), a second positioning spring (a3) and a plurality of electrical contacts (a4) provided in the first receiving space (a1). The electrical contacts (a4) are disposed on a bottom end of the first receiving space (a1). When a battery pack (c1) is provided in the first receiving space (a1), the first positioning spring units (a2) tightly clamp the two sides of the battery pack (c1). The second positioning spring (a3) urges the battery pack (c1) so as to abut tightly against an opposite wall of the first receiving space (a1). The battery pack (c1) has contact terminals (not shown) which are provided on a bottom end of the same and which tightly contact the electrical contacts (a4) when the battery pack (c1) is received in the first receiving space (a1).

Referring to FIGS. 1 and 3, the battery charging device (A) further has a pair of first positioning spring units (b2), a second positioning spring (b4) and a plurality of electrical contacts (b3) provided in the second receiving space (b1). The electrical contacts (b4) are disposed on one side of the second receiving space (b1) opposite to the second positioning spring (b4). When a battery pack is provided in the second receiving space (b1), the first positioning spring units (b2) tightly clamp the two sides of the battery pack. The second positioning spring (b4) urges the battery pack so that the contact terminals (not shown) of the latter tightly contact the electrical contacts (b3).

Note that the springs (a2, b2) are deformed if a relatively large battery pack is forced into the receiving spaces (a1, b1). Positioning of a smaller battery pack in the receiving spaces (a1, b1) is difficult to achieve when the springs (a2, b2) are deformed, thereby preventing proper electrical connection between the battery pack and the charger circuit (not shown). Note also that the springs (a2, a3, b2, b4) are unable to position properly a relatively small battery pack in the receiving spaces (a1, b1). This can also prevent proper electrical connection between the battery pack and the charger circuit.

SUMMARY OF THE INVENTION

Therefore, the objective of the present invention is to provide a battery charging device which is adapted to receive and charge battery packs of different sizes and specifications.

More specifically, the objective of the present invention is to provide a battery charging device which has an adjustable battery receiving space to receive different sizes of battery packs.

Another objective of the present invention is to provide a battery charging device which has electrical contacts that can be moved so as to be aligned with the contact terminals of a target battery pack.

Accordingly, the preferred embodiment of a battery pack charging device of the present invention comprises:

a housing having a base plate, a first upright wall extending upwardly from the base plate and a second upright wall similarly extending upwardly from the base plate and being disposed opposite to the first upright wall, said first and second upright walls and said base plate defining a receiving space to receive a battery pack;

a movable wall assembly provided in the receiving space adjacent to the first upright wall, said movable wall assembly including a positioning wall member facing the second upright wall and being spaced from the second upright wall, said positioning wall member being movable towards or away from the first upright wall so as to vary the space between the positioning wall member and the second upright wall in order to correspond with the width of the battery pack, said movable wall assembly further including a retaining means for releasably retaining the positioning wall member at a desired position relative to the first upright wall; and a movable electrical contact assembly including: a frame mounted on at least one of the second upright wall and the base plate; an elongated carriage movably mounted along a respective frame; a positioning means for releasably retaining the carriage at a desired position relative to the respective frame; and a pair of terminal seats movably mounted on the carriage and having a respective electrical contact provided thereon, said terminal seats being movable along the carriage and said carriage being movable along the respective frame so as to align the electrical contacts with corresponding contact terminals of the battery pack.

BRIEF DESCRIPTION OF THE DRAWING

Other features and advantages of the present invention will become apparent in the following detailed description of the preferred embodiment, with reference to the accompanying drawings, of which:

FIG. 5 is an exploded view of a movable wall assembly of the preferred embodiment;

FIG. 8A is a sectional view illustrating left and right adjustments of the adjustable spring unit shown in FIG. 8;

FIG. 8B is a sectional view illustrating forward and rearward adjustments of the adjustable spring unit shown in FIG. 8;

DETAILED DESCRIPTION OF THE PREFERRED EMBODIMENT

Figure 1:
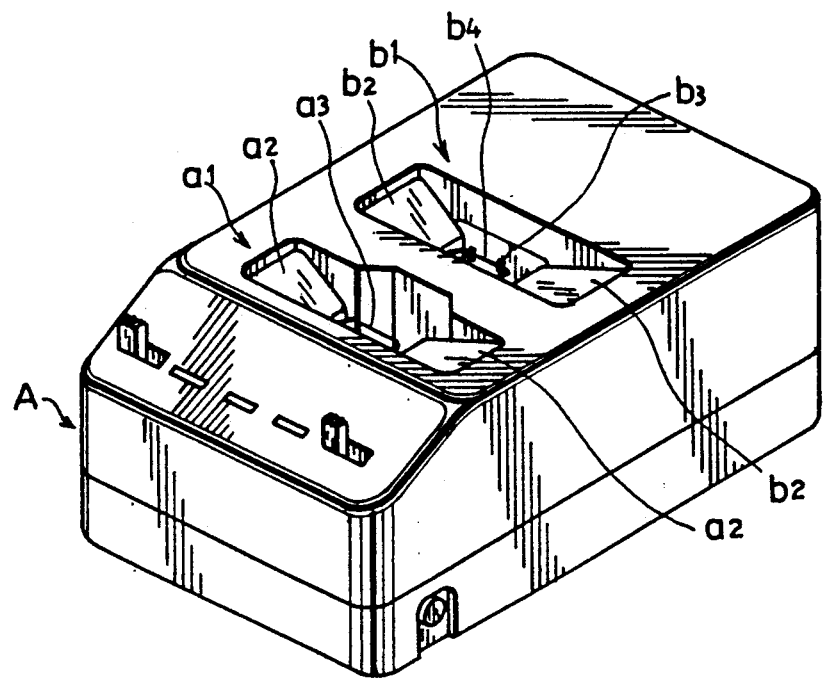
FIG. 1 is a perspective view of a conventional battery charging device.
Figure 2:
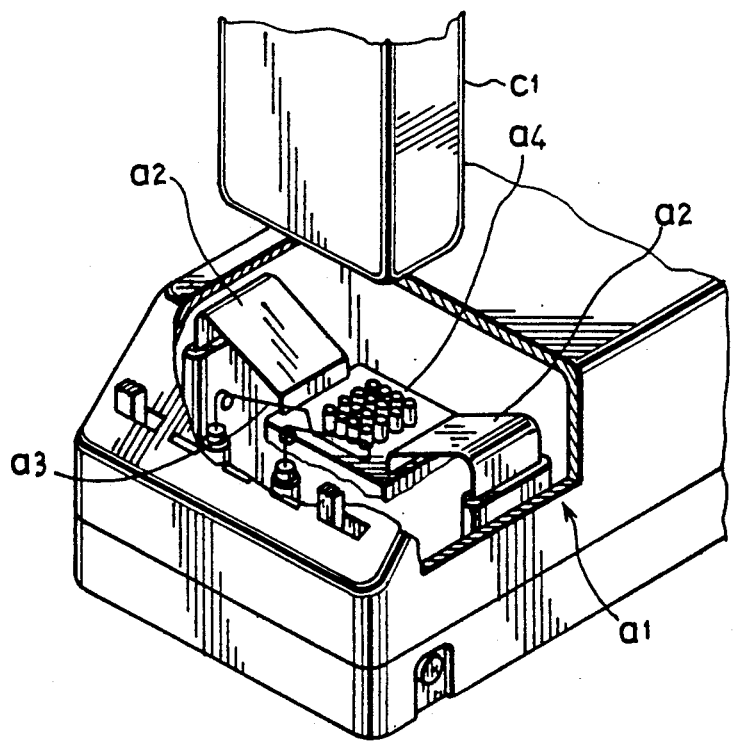
FIG. 2 is a fragmentary view which illustrates a first receiving space of the battery charging device shown in FIG. 1.
Figure 3:
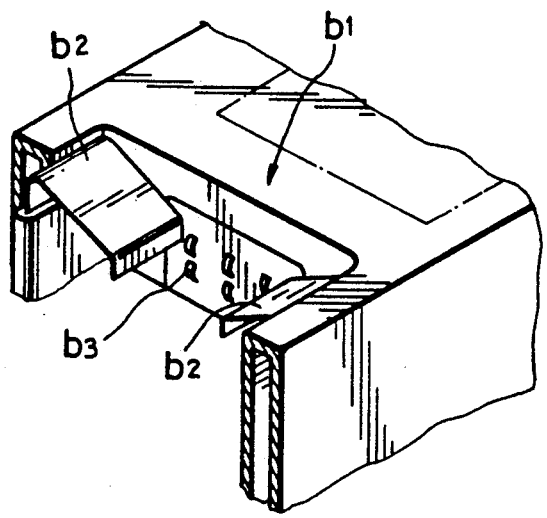
FIG. 3 is a fragmentary view which illustrates a second receiving space of the battery charging device shown in FIG. 1.
Figure 4:
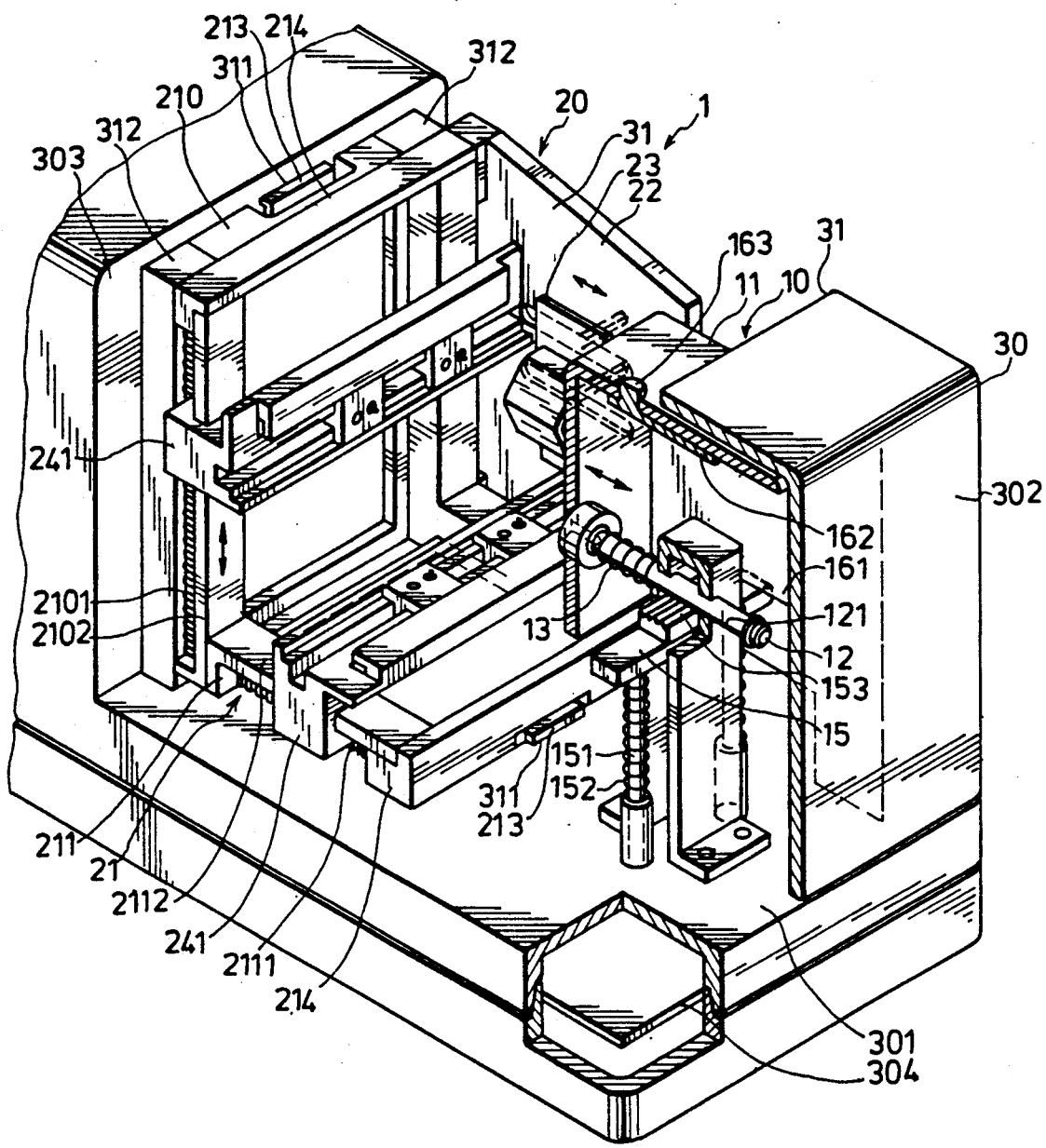
FIG. 4 is a fragmentary, partially sectional view of the preferred embodiment of a battery charging device according to the present invention.

Referring to FIG. 4, the preferred embodiment of a battery charging device (1) according to the present invention is shown to comprise a movable wall assembly (10), a movable electrical contact assembly (20) and a housing (30).

Referring to FIG. 5, the movable wall assembly (10) is shown to comprise a positioning wall member (11) which has an upright wall portion (110) that is formed with a locking hole (112). The wall member (11) further has a horizontal wall portion (113) which extends rearwardly from a top end of the upright wall portion (110) and which is formed with a through hole (111). A looking shaft (12) extends rearwardly from the upright wall portion (110) and has one end which is secured to the upright wall portion (110) at the locking hole (112). The locking shaft (12) has a bottom side which is formed with a longitudinal toothed section (121). A helical compression spring (13) is sleeved around the locking shaft (12). A mounting seat (14) has a spaced pair of upright plate parts (140) which are provided with aligned through holes (141). Each of the plate parts (140) has a lower end which is secured to a base plate (301) of the housing (30) adjacent to a first stationary upright wall (302) of the latter, as shown in FIG. 4. A shaft engaging unit (15) is provided between the plate parts (140) and has a length which is longer than the width of the plate parts (140). The shaft engaging unit (15) has a pair of legs (151). Each of the legs (151) has a helical compression spring (152) provided around the same The shaft engaging unit (15) has a top side which is formed with a toothed portion (153). A release member (16) includes a spaced pair of upright plates (161). The distance between the upright plates (161) is longer than the width of the mounting seat (14) but is shorter than the length of the shaft engaging unit (15). The lower ends of the upright plates (161) therefore rest on top of the shaft engaging unit (15). A top plate (162) interconnects the upper ends of the upright plates (161) and is provided with an upwardly projecting button (163). The top plate (162) is secured to the bottom side of the wall portion (113) such that the button (163) projects into and out of the through hole (111).

Figure 6A:
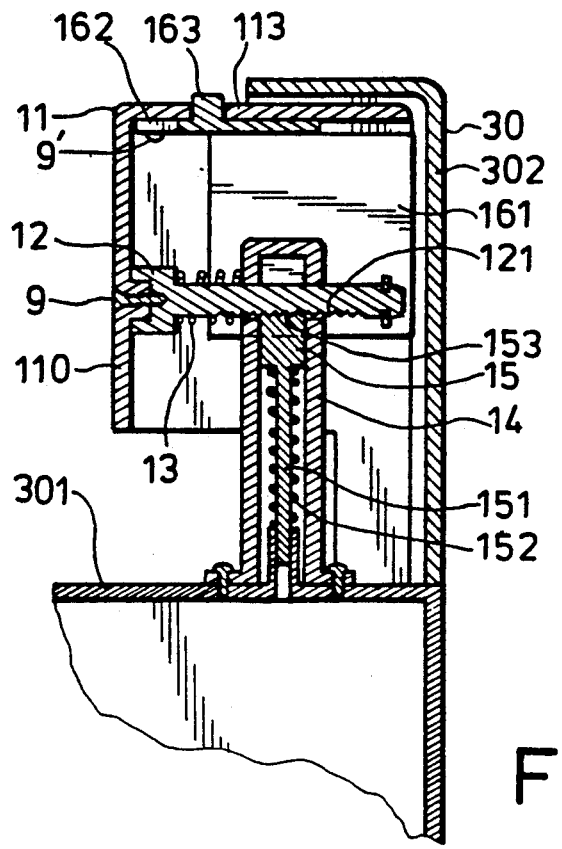
FIG. 6A is a sectional view of the movable wall assembly when in a locked position.

Referring once more to FIG. 4, the housing (30) has a battery pack receiving space (31), the width of which is defined by the first upright wall (302) and by a second upright wall (303) which is disposed opposite to the first upright wall (302). Referring to FIG. 6A, the movable wall assembly (10) is assembled as follows: A first screw (9) is provided so as to fasten the locking shaft (12) to the wall portion (110). A pair of second screws (9') [only one screw (9') is shown] are provided so as to fasten the top plate (162) of the release member (16) to the wall portion (113). The mounting seat (14) is secured to the base plate (301) of the housing (30). The compression spring (13) is provided around the locking shaft (12). The toothed section (121) of the locking shaft (12) extends through the holes (141) Of the mounting seat (14). The shaft engaging unit (15) is provided between the plate parts (140) of the mounting seat (14) such that the toothed portion (153) of the shaft engaging unit (15) is directly below the toothed section (121) of the locking shaft (12). The compression springs (152) are provided around the legs (151) and bias the shaft engaging unit (15) so that the toothed portion (153) of the shaft engaging unit (15) engages the toothed section (121) of the locking shaft (12) in order to arrest movement of the wall member (11) relative t o the upright wall (302), thereby preventing adjustments in the width of the receiving space (31). The lower ends of the upright plates (161) of the release member (16) rest on top of the shaft engaging unit (15).

Figure 6B:
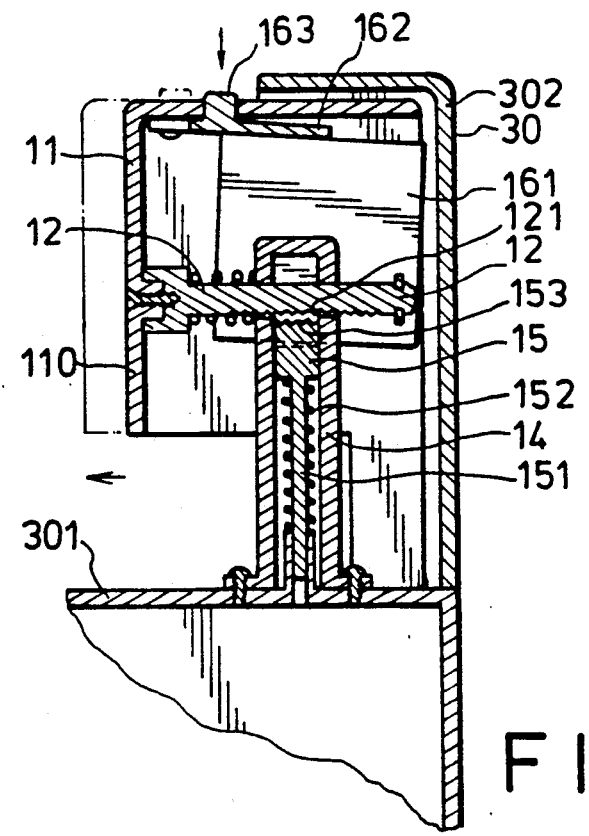
FIG. 6B is an illustration of the movable wall assembly when in an unlocked position.

When it is desired to adjust the width of the receiving space (31), the button (163) of the release member (16) is pressed, thereby causing the upright plates (161) to push the shaft engaging unit (15) downward so as to disengage the toothed portion (153) from the toothed section (121), as shown in FIG. 6B. Disengagement of the toothed portion (153) from the toothed section (121) can cause the compression spring (13) to expand and move the wall member (11) away from the upright wall (302) so as to narrow the receiving space (31). The wall member (11) may also be pushed toward the upright wall (302) so as to compress the spring (13) further in order to widen the receiving space (31). The wall member (11) is retained in the desired position by simply releasing the button (163) so as to cause the compression springs (152) to expand and urge the shaft engaging unit (15) upwardly in order to permit engagement between the toothed portion (153) and the toothed section (121).

Referring to FIGS. 4, 7, 8 and 9, the movable electrical contact assembly (20) is shown to comprise a carriage support (21), a pair of upright side walls (22) secured on opposite sides of the carriage support (21) [only one side wall (22) is shown], a pair of adjustable spring units (23) [only one spring unit (23) is shown] and a pair of adjustable electrical contact units (24).

Figure 7:
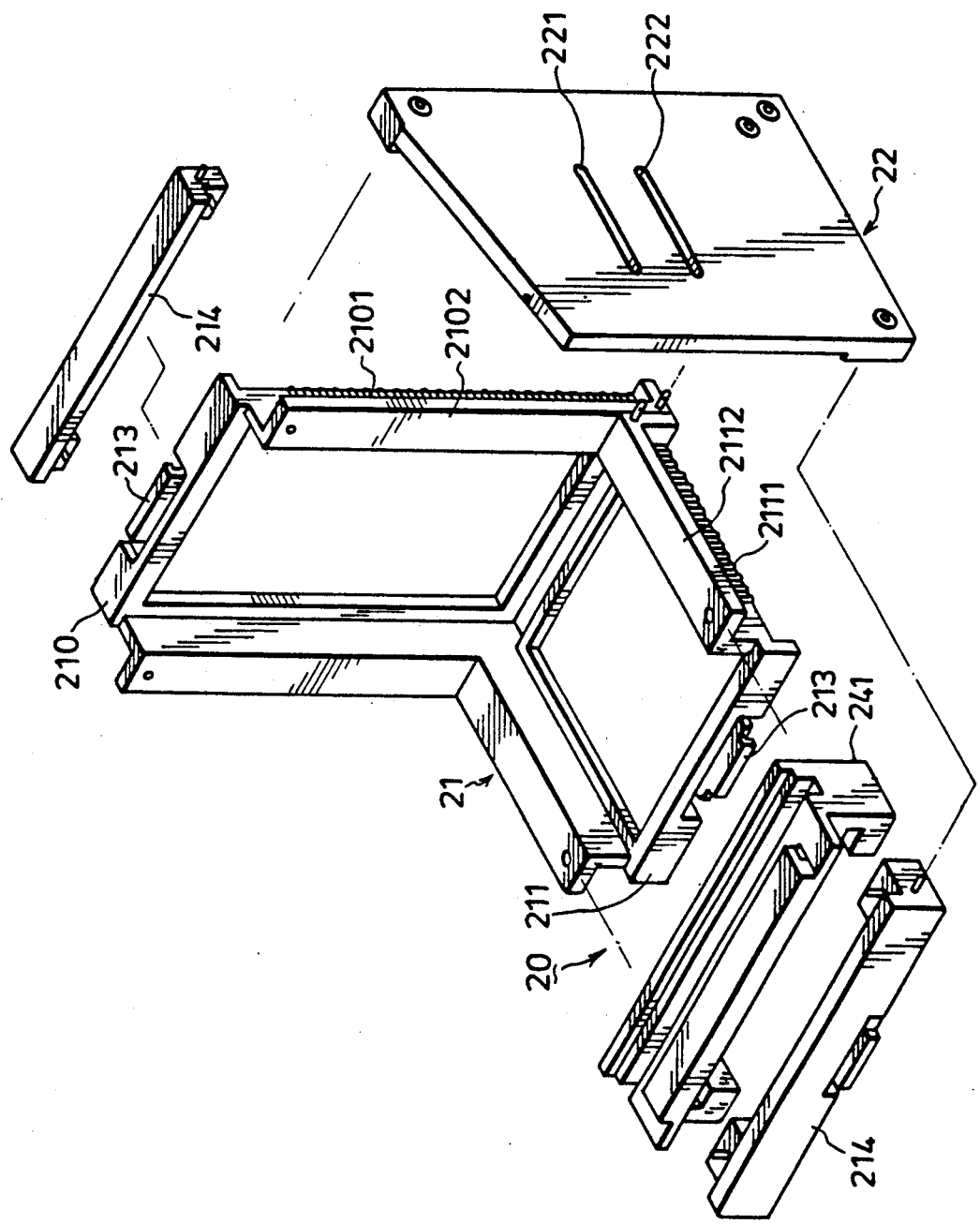
FIG. 7 illustrates a carriage support of a movable electrical contact assembly of the preferred embodiment.

Referring to FIG. 7, the carriage support (21) is substantially L-shaped and includes a vertically extending frame (210) and a horizontally extending frame (211). The vertically extending frame (210) has two sides which are respectively formed with a series of teeth (2101) and outwardly and longitudinally extending flanges (2102). The horizontally extending frame (211) has two sides which are respectively formed with a series of teeth (2111) and outwardly and longitudinally extending flanges (2112). Positioning hooks (213) are provided on the topmost end of the vertically extending frame (210) and on the front end of the horizontally extending frame (211). Cover panels (214) are provided between the side walls (22) and extend along the topmost end of the vertically extending frame (210) and along the front end of the horizontally extending frame (211).

Figure 8:
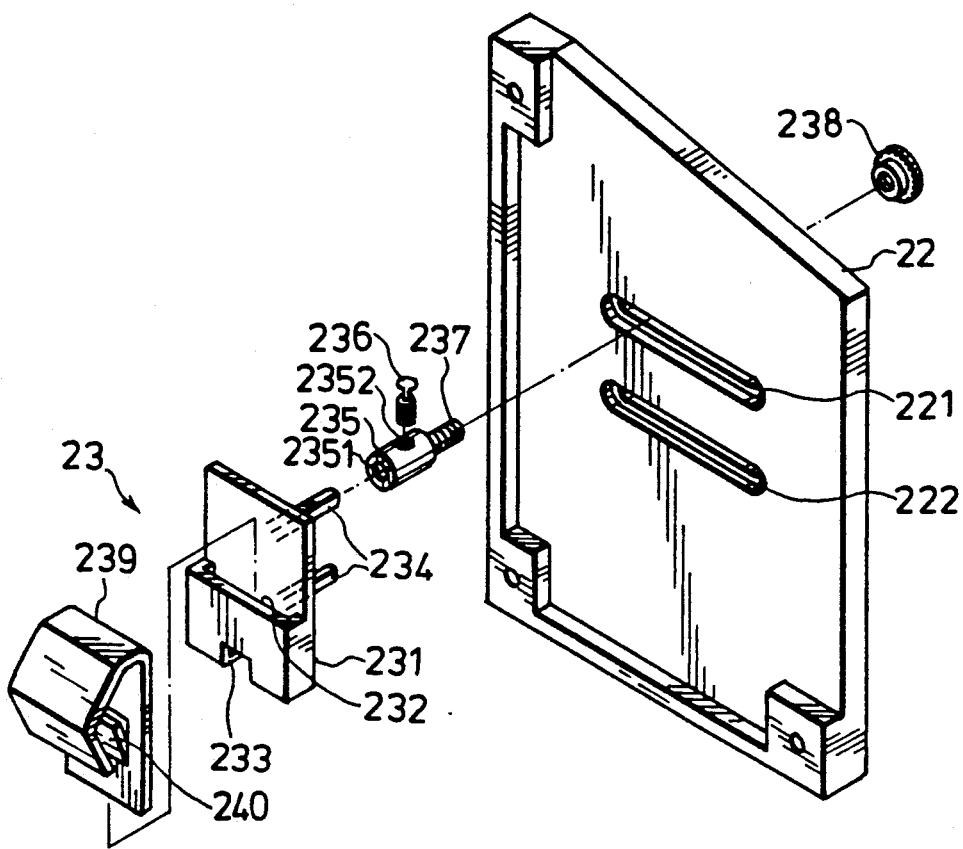
FIG. 8 is an exploded view of an adjustable spring unit of the movable electrical contact assembly of the preferred embodiment.

Referring to FIG. 8, each of the side walls (22) is provided with upper and lower horizontal slots (221, 222). Each of the adjustable spring units (23) comprises a slide piece (231) which has a front side that is provided with a spring retaining pocket (232). The front side of the slide piece (231) is further formed with a groove (233) at a lower end of the retaining pocket (232). The rear side of the slide piece (231) is formed with a pair of rearwardly extending stubs (234) which are aligned with a respective one of the horizontal slots (221, 222). Each of the stubs (234) extend retractably into a blind bore (2351) which is formed on a rear end of a locking member (235) [only one locking member (235) is shown]. The locking member (235) is formed with a radial threaded hole (2352) to receive a screw (236). The screw (236) extends into the blind bore (235) and retains the respective stub (234) at a desired degree of insertion within the blind bore (2351). The locking member (235) further has a threaded front end (237) which extends into a respective one of the horizontal slots (221, 222). A nut (238) engages the front end (237) of the locking member (235) so as to retain the slide piece (231) at a desired position on the respective side wall (22). Each of the adjustable spring units (23) further comprises a positioning spring (239) which is provided in the retaining pocket (232) of the slide piece (231). The positioning spring (239) has a resilient engaging part (240) which engages the groove (233) so as to secure the spring (239) in the retaining pocket (232).

Referring to FIGS. 8A and 8B, adjustments in the position of the spring (239) relative to the side wall (22) are accomplished as follows: The nuts (238) are loosened so as to permit movement of the slide piece (231) along the horizontal slots (221, 222). The screws (236) are loosened so as to permit variations in the degree of insertion of the stubs (234) into the respective locking members (235).

Figure 9:
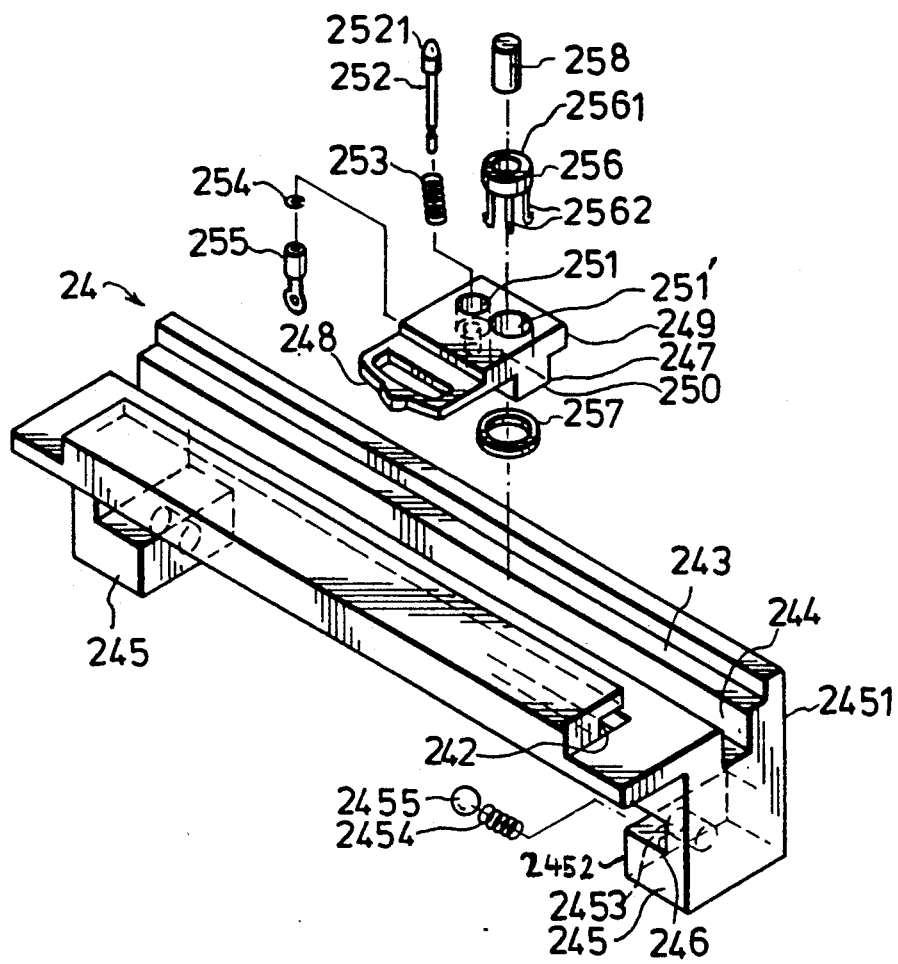
FIG. 9 is an exploded view of an adjustable electrical contact unit of the movable electrical contact assembly.

Referring to FIGS. 4, 7 and 9, each of the adjustable electrical contact units (24) comprises an elongated carriage (241) which has a front side with a first edge that is provided with a longitudinal hook portion (242) and a longitudinal through slit (244) that is disposed adjacent to an opposite second edge of the front side. The carriage (241) is further provided with a longitudinal shoulder (243) which is disposed in the through slit (244) and a pair of engaging arms (245) which project from a rear side of the carriage (241). Each of the engaging arms (245) has a first part (2451) which projects rearwardly from one end of the rear side of the carriage (241) and a second part (2452) which projects transversely and inwardly from a distal end of the first part (2451). The first and second parts (2451, 2452) and the rear side of the carriage (241) cooperate to form an engaging groove (246). Each second part (2452) has a distal end which is formed with a blind bore (2453) to receive a compression spring (2454) and a metal ball (2455).

Each of the adjustable electrical contact units (24) further comprises a pair of terminal seats (247). Each of the terminal seats (247) has a frontwardly extending positioning flange (248), a rearwardly extending flange (249) and a downwardly extending intermediate part (250). The intermediate part (250) is formed with a pair of through holes (251, 251'). An electrical contact (252) has an enlarged head (2521) and extends into the through hole (251) (Refer to FIG. 9A). The through hole (251) has a bottom end which is formed with a radial flange (2510). A compression spring (253) is provided around the electrical contact (252) in the through hole (251) and biases the enlarged head (2521) of the electrical contact (252) upwardly. The lower end of the electrical contact (252) is connected to a wire connector (255) so as to permit electrical connection between the electrical contact (252) and a charger circuit (304) which is disposed beneath the base plate (301) of the housing (30) (refer to FIG. 4). A C-shaped locking ring (254) is provided on a bottom side of the radial flange (2510) and engages the lower end of the electrical contact (252) so as to limit upward movement of the latter. A resilient hook body (256) is received in the through hole (251') and includes an annular part (2561) and a plurality of angularly spaced hook units (2562) which project downwardly from the annular part (2561). The hook units (2562) extend through the slit (244) of the carriage (241) and engage a washer (257) which is in tight contact with the rear side of the carriage (241). A pin (258) extends fittingly into the hook body (256) so as to prevent the untimely disengagement of the latter from the washer (257).

Figure 9A:
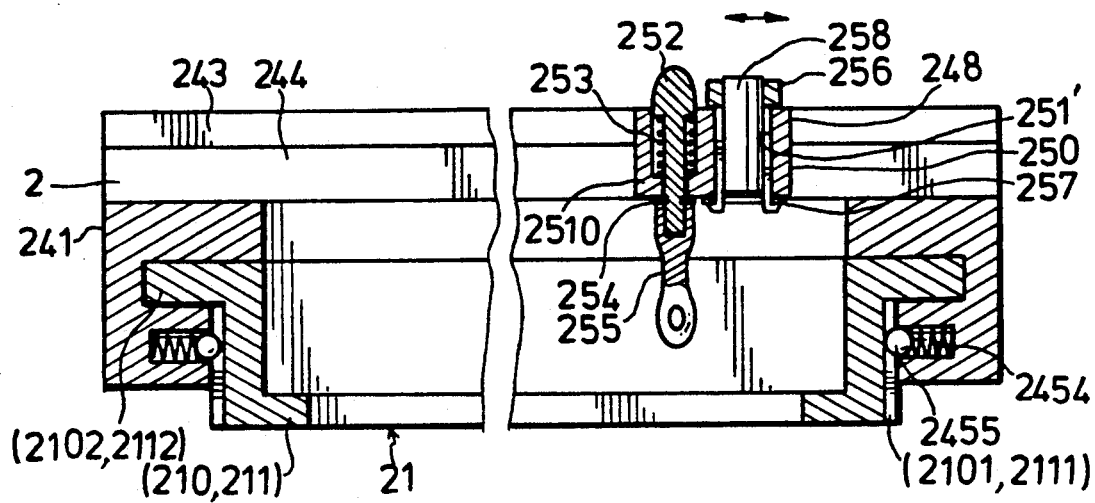
FIG. 9A is a sectional view illustrating left and right movement of a terminal seat of the adjustable electrical contact unit shown in FIG. 9.

Assembly of the adjustable electrical contact unit (24) is as follows: The terminal seats (247) are provided on the respective carriage (241) such that the respective positioning flange (248) of the former extends into the hook portion (242) of the latter and such that the respective flange (249) of the former rests on the shoulder (243) of the latter. The respective intermediate part (250) of the terminal seats (247) extends into the slit (244) of the carriage (241). Referring to FIG. 9A, any adjustment in the position of the terminal seat (247) in the slit (244) is achieved by disengaging the pin (258) from the hook body (256) so as to permit the removal of the hook body (256) from the washer (257). The terminal seat (247) can be movably slid along the slit (244) at this stage. Note that the movement of the terminal seat (247) along the slit (244) is limited by the side walls (22), as shown in FIG. 4. The hook body (256) engages the washer (257), and the pin (258) extends fittingly into the hook body (256) in order to lock the terminal seat (247) at a desired position in the slit (244).

Figure 9B:
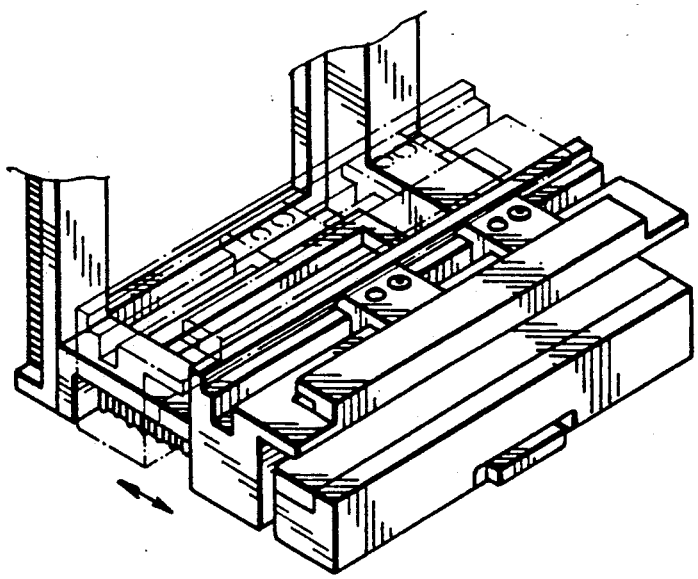
FIG. 9B illustrates forward and rearward movement of a carriage of the adjustable electrical contact unit shown in FIG. 9.

Referring to FIGS. 7, 9, 9A and 9B, the carriages (241) are mounted on the carriage support (21) such that the flanges (2102, 2112) of the latter extend into the engaging grooves (246) of the former. The compression springs (2454) in the blind bores (2453) of the carriages (241) bias the respective metal ball (2455) so as to engage releasably one of the teeth (2101, 2111) on the carriage support (21). The carriages (241) are therefore movable along the lengths of the frames (210, 211) of the carriage support (21), as shown in FIG. 9B.

Referring once more to FIG. 4, the base plate (301) and the second upright wall (303) of the housing (30) are each formed with a retaining cavity (311) to receive a respective one of the positioning hooks (213) of the carriage support (21) therein. The carriage support (21) is positioned between a pair of spaced, upright guide projections (312) which are formed on the second upright wall (303) of the housing (30). The positioning hooks (213) facilitate the assembly and removal of the carriage support (21) from the housing (30) when conducting repairs and replacement of parts.

The following is a brief summary of the operation of the preferred embodiment:

When a battery pack (not shown) is provided in the receiving space (31), the button (163) is pressed in order to permit adjustments to the width of the receiving space (31) so as to correspond with that of the battery pack. The nuts (238) and the screws (236) are then loosened in order to adjust the position of the springs (239) so as to enable the springs (239) to clamp the two sides of the battery pack, thereby properly positioning the battery pack in the receiving space (31). The terminal seats (247) are then moved along the slit (244) of the carriage (241), and the carriages (241) are moved along the lengths of the frames (210, 211) of the carriage support (21) so as to align the electrical contacts (252) with the contact terminals of the battery pack.

It has thus been shown that effective charging of a battery pack can be accomplished when the battery pack charging device of the present invention is in use, regardless of the size of the battery pack and the location of the contact terminals of the battery pack.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A battery pack charging device, comprising:
   a housing having a base plate, a first upright wall extending upwardly from said base plate and a second upright wall similarly extending upwardly from said base plate and being disposed opposite to said first upright wall, said first and second upright walls and said base plate defining a receiving space to receive a battery pack;
   a movable wall assembly provided in said receiving space adjacent to said first upright wall, said movable wall assembly including a positioning wall member facing said second upright wall and being spaced from said second upright wall, said positioning wall member being movable towards or away from said first upright wall so as to vary the space between said positioning wall member and said second upright wall in order to correspond with the width of the battery pack, said movable wall assembly further including a retaining means for releasably retaining said positioning wall member at a desired position relative to said first upright wall; and
   a movable electrical contact assembly including: a frame mounted on at least one of said second upright wall and said base plate; an elongated carriage movably mounted along a respective said frame; a positioning means for releasably retaining said carriage at a desired position relative to the respective said frame; and a pair of terminal seats movably mounted on said carriage and having a respective electrical contact provided thereon, said terminal seats being movable along said carriage and said carriage being movable along the respective said frame so as to align said electrical contacts with corresponding contact terminals of the battery pack.

2. The battery pack charging device as claimed in claim 1, wherein said retaining means comprises:
   a locking shaft extending rearwardly from said positioning wall member toward said first upright wall and having a bottom side that is formed with a longitudinal toothed section;
   a mounting seat secured to said base plate and having a spaced pair of upright plate parts which are provided with aligned through holes, said toothed section of said locking shaft passing through said through holes of said upright plate parts;
   a shaft engaging unit provided between said upright plate parts and having one side which is formed with a toothed portion;
   a biasing means for biasing said shaft engaging unit so that said toothed portion of said shaft engaging unit engages said toothed section of said locking shaft so as to arrest movement of said positioning wall member relative to said first upright wall; and
   a release means which is operable so as to move said shaft engaging unit away from said locking shaft in order to disengage said toothed portion from said toothed section and permit movement of said positioning wall member relative to said first upright wall.

3. The battery pack charging device as claimed in claim 2, wherein said retaining means further comprises a helical compression spring provided around said locking shaft and disposed between said positioning wall member and said mounting seat.

4. The battery pack charging device as claimed in claim 1, wherein:
   said frame has at least one side which is formed with a series of teeth and an outwardly and longitudinally extending flange;
   said carriage has a rear side which is provided with at least one engaging arm, said engaging arm including a first part which projects from said rear side of said carriage and a second part which projects transversely and inwardly from a distal end of said first part, said first and second parts and said rear side of said carriage cooperatively forming an engaging groove which receives said flange of the respective said frame, said second part having a distal end which is formed with a blind bore; and
   said positioning means comprises a spring-loaded ball unit received in said blind bore and releasably engaging one of said teeth of said frame so as to retain said carriage at a desired position relative to the respective said frame.

5. The battery pack charging device as claimed in claim 4, wherein:
   said carriage has a front side with a first edge, an opposite second edge, a longitudinal hook portion provided adjacent to said first edge, a longitudinal through slit disposed adjacent to said second edge and a longitudinal shoulder which is disposed in said through slit;
   each of said terminal seats having a frontwardly extending positioning flange which extends into said longitudinal hook portion, a rearwardly extending flange which rests on said longitudinal shoulder and a downwardly extending intermediate part which is formed with a pair of receiving holes and which extends into said through slit of said carriage, said electrical contact being disposed in one of said receiving holes, each of said terminal seats further having a locking means disposed in the other one of said receiving holes so as to retain the respective one of said terminal seats at a desired position on said carriage.

6. The battery pack charging device as claimed in claim 5, wherein said locking means comprises:
- a resilient hook body having an annular part and a plurality of angularly spaced hook units which project downwardly from said annular part and which extend through said slit of said carriage;
- a washer which is in tight contact with said rear side of said carriage and which is retained thereat by said hook units; and
- a pin which extends fittingly into said hook body so as to prevent the untimely disengagement of said hook body from said washer.

7. The battery pack charging device as claimed in claim 5, wherein said electrical contact is spring-loaded.

8. The battery pack charging device as claimed in claim 1, wherein said frame is detachably mounted to said housing.

9. The battery pack charging device as claimed in claim 1, wherein:
- said housing further comprises a pair or spaced side walls extending upwardly from said base plate and disposed between said first and second upright walls, each of said side walls being provided with a horizontal slot; and
- said movable electrical contact assembly further comprises a pair of adjustable spring units, each of said adjustable spring units including: a slide piece which has a front side that is provided with a spring retaining pocket and a rear side which is provided with a rearwardly extending stub that is aligned with said horizontal slot; a locking member having a rear end which is formed with a blind bore to receive said stub, said locking member further having a radial threaded hole and a screw received in said threaded hole and extending into said blind bore to retain said stub at a desired degree of insertion within said blind bore, said locking member further having a threaded front end which extends into said horizontal slot; a nut engaging said front end of said locking member so as to retain said slide piece at a desired position on a respective one of said side walls; and a positioning spring provided in said retaining pocket of said slide piece, said positioning springs of said adjustable spring units clamping two sides of the battery pack so as to position the battery pack properly in said receiving space.

* * * * *